Nov. 2, 1954

M. IRELAND 2,693,142

BREAD-ACTUATED ELECTRIC TOASTER

Filed Dec. 10, 1949

INVENTOR.
MURRAY IRELAND
BY
Attorney

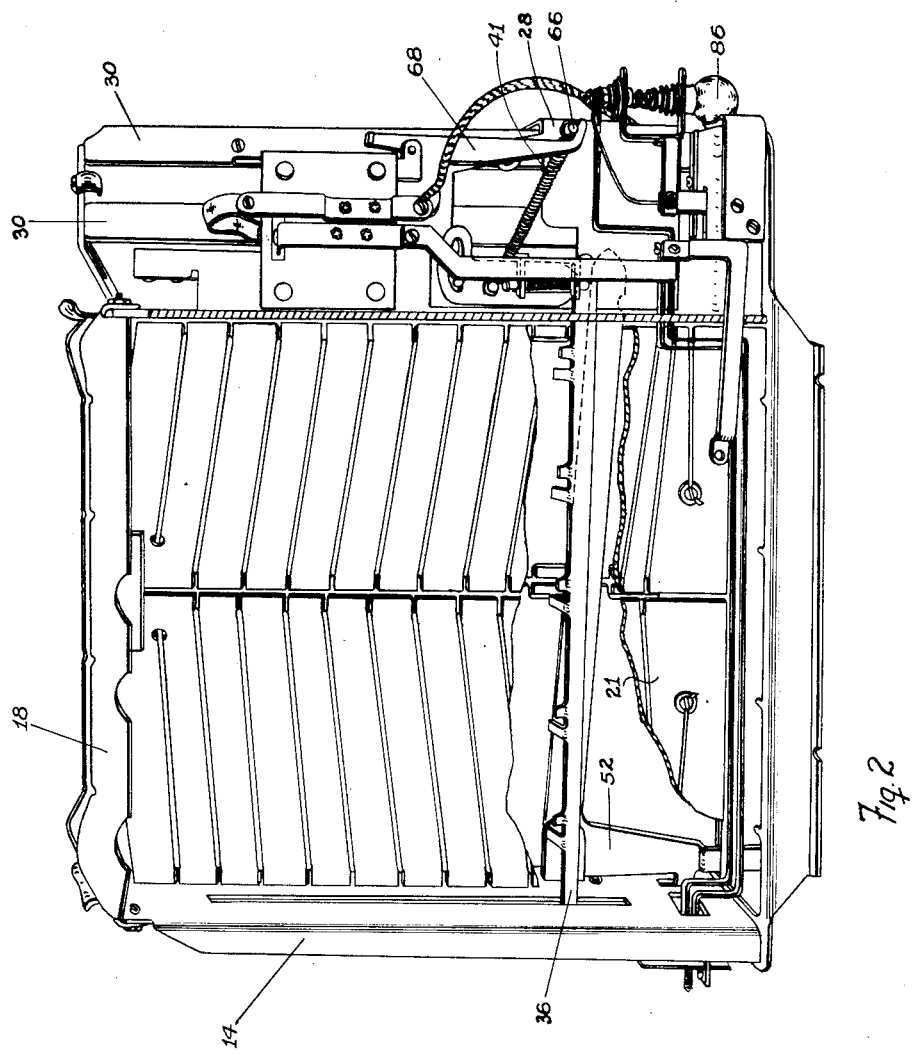

Nov. 2, 1954  M. IRELAND  2,693,142
BREAD-ACTUATED ELECTRIC TOASTER
Filed Dec. 10, 1949  7 Sheets-Sheet 3
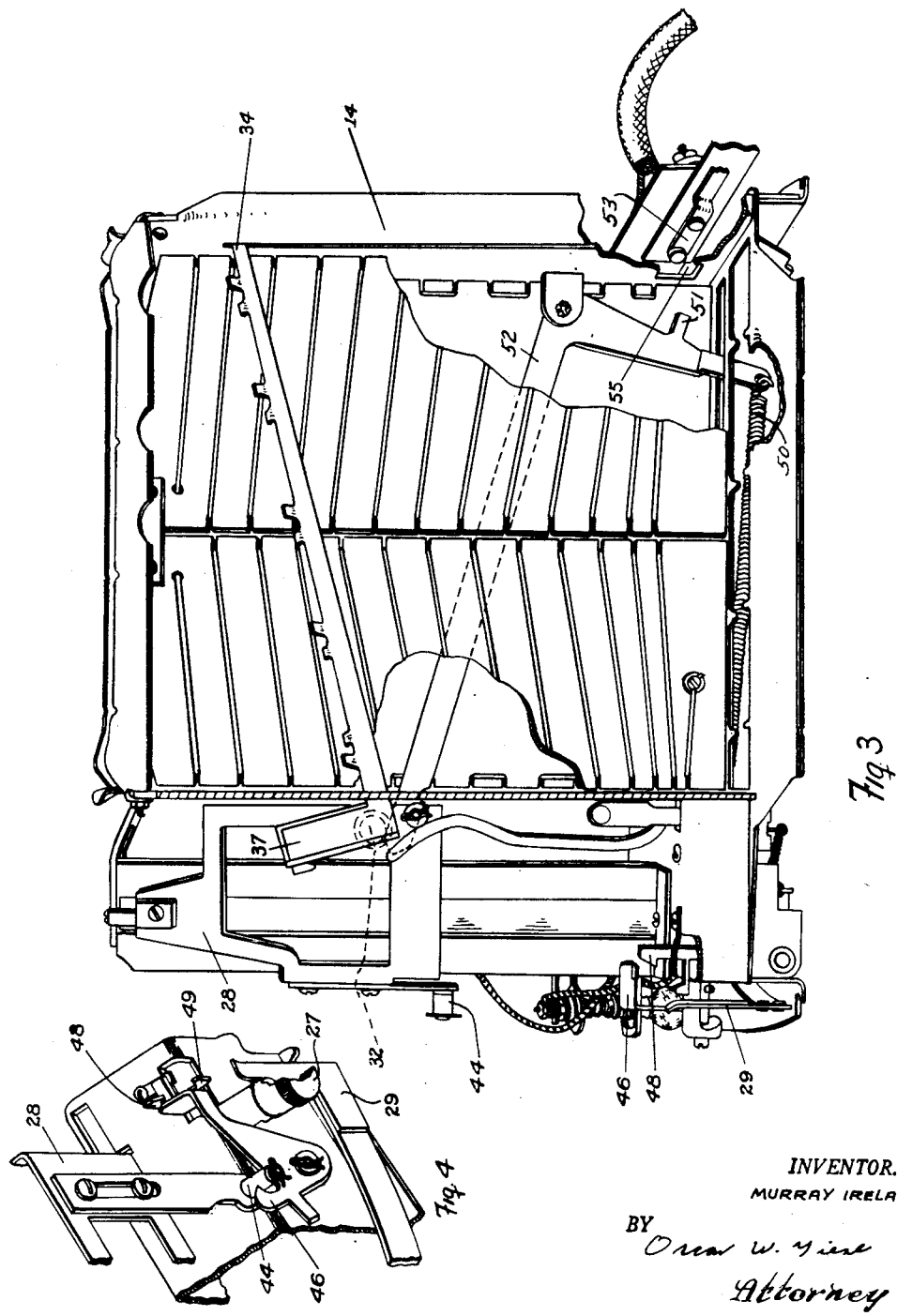
INVENTOR.
MURRAY IRELAND
BY
*Oscar W. Yiese*
*Attorney*

Nov. 2, 1954   M. IRELAND   2,693,142
BREAD-ACTUATED ELECTRIC TOASTER
Filed Dec. 10, 1949   7 Sheets-Sheet 4

INVENTOR.
MURRAY IRELAND
BY
Omar W. Tice
Attorney

INVENTOR.
MURRAY IRELAND

Nov. 2, 1954  M. IRELAND  2,693,142
BREAD-ACTUATED ELECTRIC TOASTER
Filed Dec. 10, 1949  7 Sheets-Sheet 6

INVENTOR.
MURRAY IRELAND
BY
Attorney

Nov. 2, 1954　　　　　M. IRELAND　　　　　2,693,142
BREAD-ACTUATED ELECTRIC TOASTER
Filed Dec. 10, 1949　　　　　　　　　　　　　　7 Sheets-Sheet 7
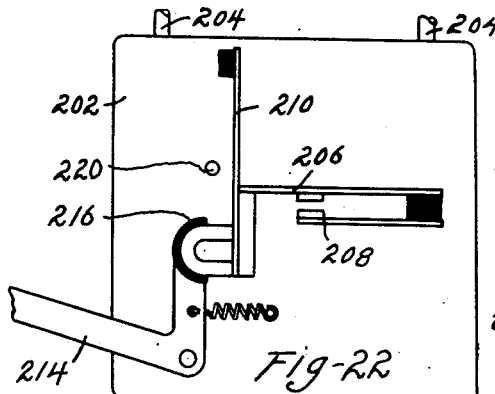
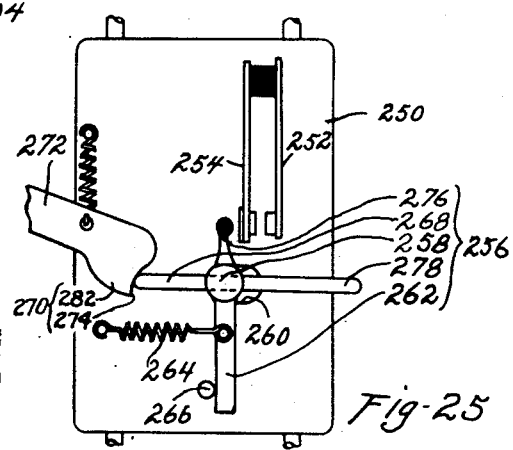
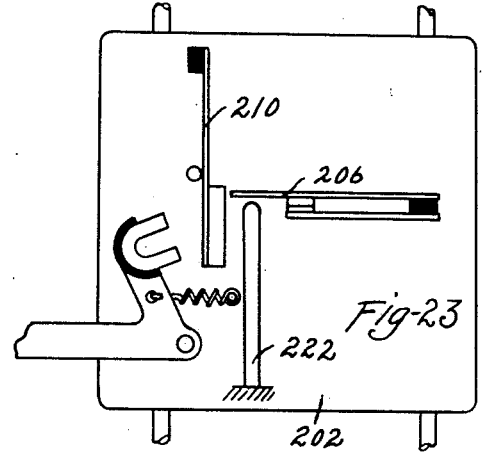
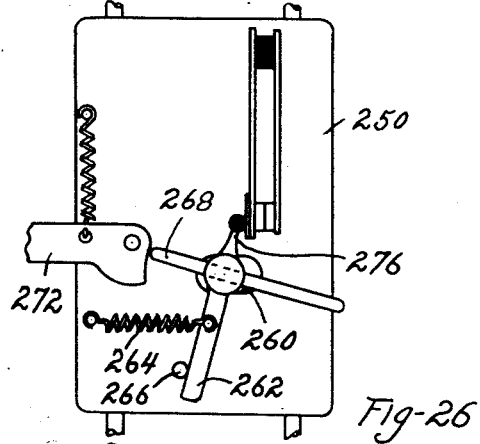
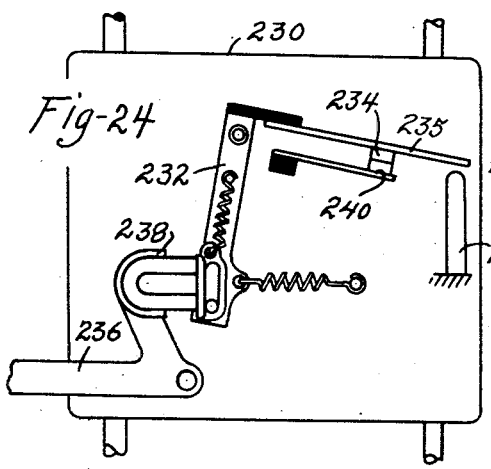
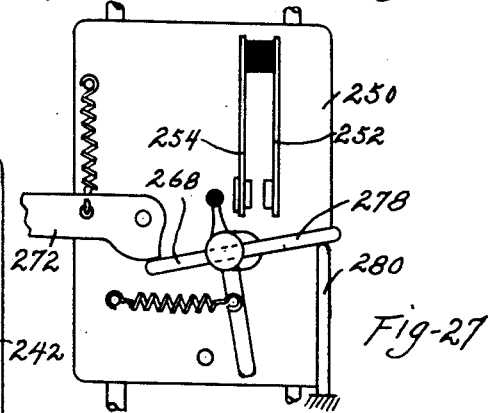
INVENTOR.
MURRAY IRELAND
BY
Omar W. Vine
Attorney United States Patent Office
2,693,142
Patented Nov. 2, 1954

2,693,142
BREAD-ACTUATED ELECTRIC TOASTER

Murray Ireland, Elgin, Ill., assignor to McGraw Electric Company, Elgin, Ill., a corporation of Delaware Application December 10, 1949, Serial No. 132,304

14 Claims. (Cl. 99—391)

The present invention relates to cooking devices and particularly to automatic, electric toasters and bread-actuated controls therefor.

In the automatic electric toaster of U. S. Patent 2,288,713 a vertically movable tray responds to the placing of a slice of bread thereon to lower the bread into an oven for toasting. After the correct toasting period a timer actuates the tray to lift the bread above the oven where it may be grasped for removal. An interlock included in the tray-control mechanism prevents the immediate relowering of the trays in response to the mere presence of the toast thereon, and requires that the trays be unloaded and then reloaded for starting a new toasting cycle.

Objects of the present invention include the provision of an improved and simplified mechanism for accomplishing this control of a motor-operated tray in an automatic electric toaster or the like, the provision of an improved article-actuated control for a cooking device, the provision of an improved control switch, and the provision of an improved electric toaster.

These and other objects and advantages will be apparent from the following description of certain specific embodiments of the invention which serve by way of example to illustrate the manner in which the invention may be put into practice. In the drawings:

Fig. 2 is a side view in perspective of the toaster of Fig. 1 showing certain other details of the mechanism;

Fig. 3 is a perspective view of the other side of the toaster, again with certain parts cut away;

Fig. 4 is a perspective view showing certain details of the timer-controlled latch of the toaster of Figs. 1–3;

Figs. 22 and 23 show an eighth construction;

Fig. 24 shows a ninth construction; and,

Figs. 25, 26 and 27 show three operated positions of still another construction.

Figure 1:
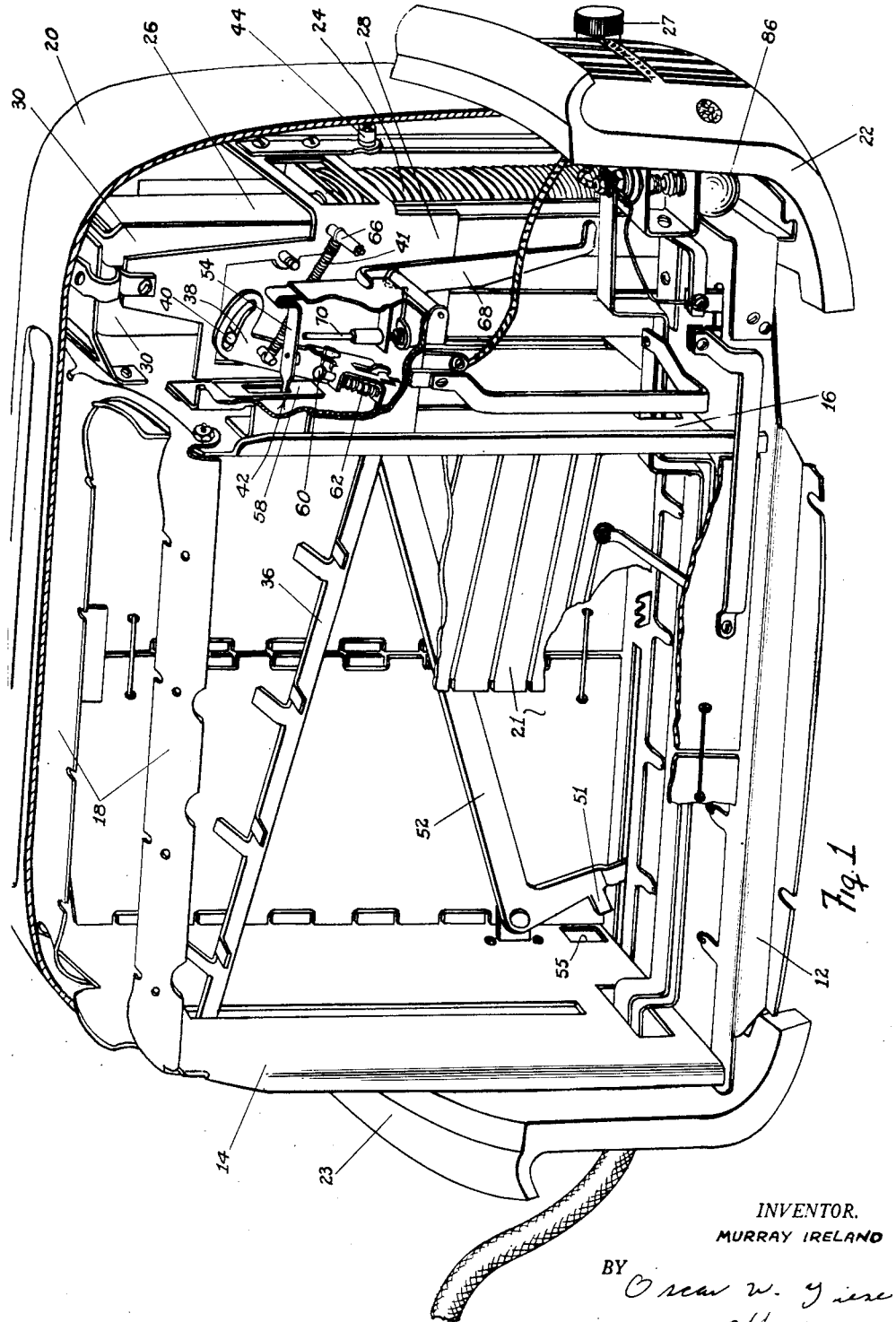
Figure 1 is a perspective view of an automatic electric toaster embodying the present invention, wherein certain parts are shown cut away to reveal the mechanism and to facilitate the description.

In the construction of Figs. 1–9, the frame structure of the toaster comprises a base 12 (Figs. 1, 2 and 3), oven end walls 14 and 16, and a slotted oven cap 18. Fastened to this frame structure are an outer casing, of which one half-shell 20 is shown in Fig. 1, and two combined carrying handles and feet 22 and 23. Four toasting heaters 21 are mounted in the oven space.

Supported on the base 12 is a solenoid magnet 24 (Figs. 1 and 3) having a movable core 26 which drives a movable carriage 28 on vertical guides 30. As is best shown in Fig. 3, the carriage 28 supports a horizontal, transverse shaft 32 on which are mounted two arms 37 and 38 which in turn support two bread trays 34 and 36. (Arm 38 and tray 36 show in Figs. 1 and 2.) This particular construction is shown in more detail in applicant's copending application, Ser. No. 132,303, filed December 10, 1949, and now Patent No. 2,662,466 dated December 15, 1953.

Arm 38 (Fig. 1) has a slot that slides over a pin 40 fixed on the carriage 28. This slot and pin limit the rotation of the shaft 32 to let it swing the trays 34 and 36 only between the tilted-up position shown in Figs. 1 and 3 and a horizontal position. A spring 41 biases the trays into their tilted-up position. The weight of a slice of bread will lower them. The magnet 24 is adapted to pull the carriage 28 down to the position shown in Fig. 2 for lowering slices of bread on the trays 34 and 36 into the oven for toasting. This pull-down action of the magnet 24 is initiated by the placing of bread on racks 34 and 36 and is controlled by a switch mechanism 42 that will be described presently. When the carriage 28 is pulled down as just described, a pin 44 thereon (Figs. 1 and 4) engages a hook 46 which is held in the engaged position by a latch 48 (Fig. 4). This latch is controlled by a timing mechanism which actuates it for releasing the carriage at the end of the time required for proper toasting. While I may employ any suitable device or mechanism for this purpose I prefer a thermal timer of the heat-up cool-off type such as that shown and described in U. S. Patent 2,288,713 already referred to. Alternatively, the latch 48 may be operated for releasing carriage 28 by means of the manual push button 27 (Figs. 1 and 4) which when pushed moves spring-mounted bar 29 against a projecting end 49 of hook 48.

As is indicated best in Fig. 3, a spring 50 acting through a bell crank 52 which bears upward against rod 32 biases the carriage 28 toward its uppermost position. A projection 51 on bell crank 52 extends through a window 55 in end wall 14 to actuate a switch 53 for energizing the toasting heaters 21 when the trays are down. At the end of the toasting period, the carriage is released by the timer latch 48 and is lifted by spring 50 to raise the toast to a position in which it projects through the slots in the top of the case.

Figure 9:
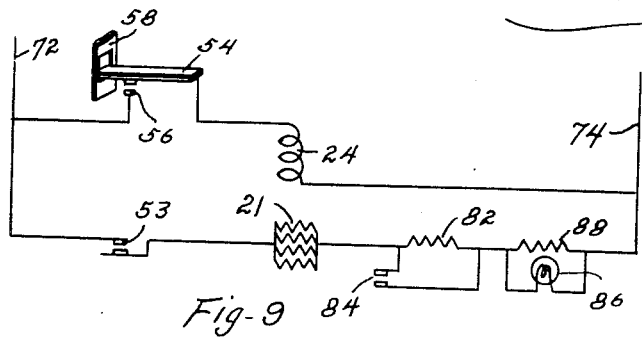
Fig. 9 is a schematic circuit diagram thereof.

The electric circuit is shown diagrammatically in Fig. 9. Electric power such as 110 v. A. C. is applied to leads 72 and 74. The magnet 24 in series with its controlling contacts 54—56 is connected directly across these power leads. The switch 53 (also shown in Fig. 3) controls the current to the oven heaters 21. Connected in series with the oven heaters 21 is a heating element 82 of a heat-up cool-off thermal timer and its shunt contacts 84 which are not otherwise shown in the drawings. Also connected in series with the oven is a signal lamp 86, which is also shown in Figs. 1 and 2, and which has a shunt resistor 88 for carrying most of the current.

Figure 5:
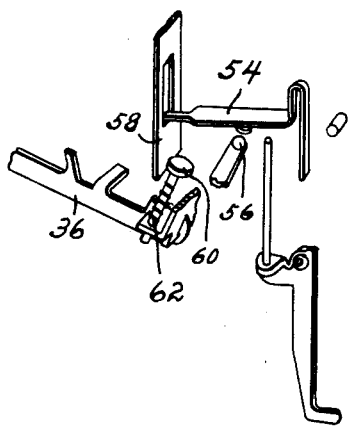
Figs. 5–8 are partially diagrammatic views for showing certain steps in the operation of the bread-actuated control mechanism of the toaster of Figs. 1–3.
Figure 6:
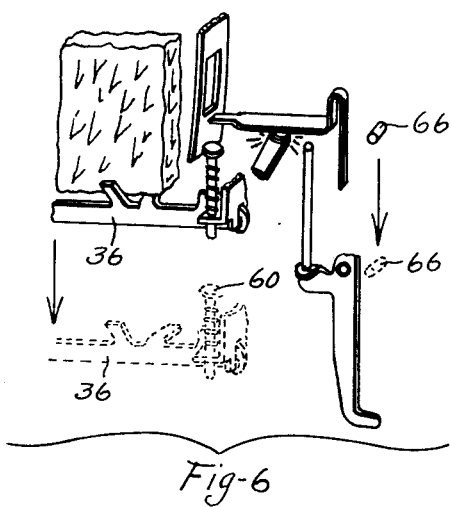
Figure 7:
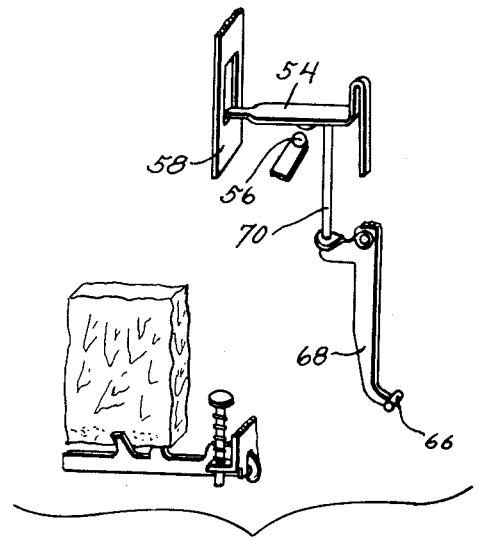

The bread-actuated control mechanism 42 is best shown in Fig. 1 and its operation is illustrated in the diagrams of Figs. 5–8 inclusive. A contact spring 54 is biased down toward a stationary contact 56 (see Fig. 5). When the toaster is idle, as in Figs. 1 and 5, this contact 56 is held in the open position by a latch spring 58 having a window which receives the end of spring 54. A plunger 60 supported in arm 38 (Fig. 1) is biased upward by spring 62 (Figs. 1 and 5) so that when the trays 34 and 36 lie in their tilted-up position, which they occupy when empty, the head of pin 60 lies in front of the lower end of spring 58 as shown in Fig. 5. Then when the trays are swung to their horizontal position by the weight of a slice of bread placed thereon, pin 60 swings back against the lower end of latch spring 58 (as shown in Fig. 6) to release spring 54 and permit it to engage contact 56. These contacts energize the magnet 24, as may be seen in the circuit diagram of Fig. 9, so that it pulls the carriage 28 down against the upward bias of spring 50. This downward motion of carriage 28 also lowers arm 30, bread racks 34 and 36, and pin 60 carried thereby, and carries pin 60 away from latch spring 58 as shown by the dotted lines in Fig. 6, so that spring 58 is released against the end of contact spring 54. During this action contacts 54—56 remain closed. As the carriage 28 approaches its lowermost position, pin 66 thereon (Figs. 1, 6 and 7) moves against the lowermost end of bell crank 68, as shown in Fig. 7, to lift pin 70 and thereby lift spring 54 off the stationary contact 56 for deenergizing magnet 24. Inasmuch as pin 60 has been moved away from latch spring 58 by the downward motion of the carriage 28, this upward motion of contact spring 54 permits latch spring 58 to reengage it and hold the magnet circuit open. The carriage 28, in moving down, has brought pin 44 (Fig. 4) down against hook 46 and forced it into engagement with timer-latch 48 so that the carriage is held down for the toasting operation. Preferably, the proportions of the parts are so adjusted that the hook 46 and latch 48 are in an engagement before the magnet circuit is opened at the contacts 54—56. To this end the magnet is arranged to pull the carriage down to a position slightly below that in which it will be held by the hook 46. In any event the momentum of the carriage will help carry it down into latched position. The mechanism remains in the position of Fig. 6, under control of timer latch 48 while the bread is being toasted. When the timer latch 48 releases the hook 46 at the end of the toasting period, the carriage 28 is raised to its uppermost position by spring 52 to bring the control mechanism into the position shown in Fig. 8. Inasmuch as the trays 34 and 36 are still loaded and therefore horizontal, pin 60 comes up just under the latch spring 58 and butts against the lower end thereof, so that pin 60 is stopped by the spring 58 before the carriage and trays reach their uppermost position. This action slightly compresses spring 62. When the toast is removed from the trays 34 and 36, spring 41 tilts the trays up to the position shown in Figs. 1, 3 and 5 and in so doing swings the pin 60 out of its alignment with the spring 58 so that the spring 62 lifts the pin 60 into the position shown in Fig. 5 ready for the next operation.

Figure 8:
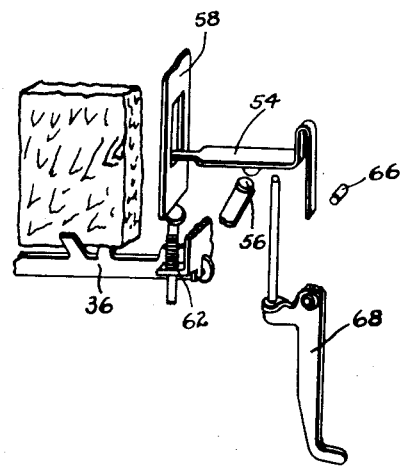

It is to be noted that the pin 60 constitutes a connecting member movable in one direction (from the position of Fig. 8 to that of Fig. 5) in response to the removal of a slice of bread from the hinged rack 36 or 34 for moving into operative engagement with the latch spring or control member 58 so that when bread is again placed on the rack to swing it to its horizontal position (Fig. 6) pin 60 can drive the latch spring 58 for releasing the contact spring 54 which then will energize the magnet 24 to lower the carriage, and with it the bread, to toasting position. It is to be noted also that this operation of the carriage in response to the placing of the bread on the rack disengages pin 60 from its driving engagement with latch spring 58. Further, upon the return of the carriage to its upper position as shown in Fig. 8, the pin 60 and latch spring 58 are in inoperative alignment and abut each other, and are resiliently urged together by the spring 62 which urges the pin 60 upward.

Figure 10:
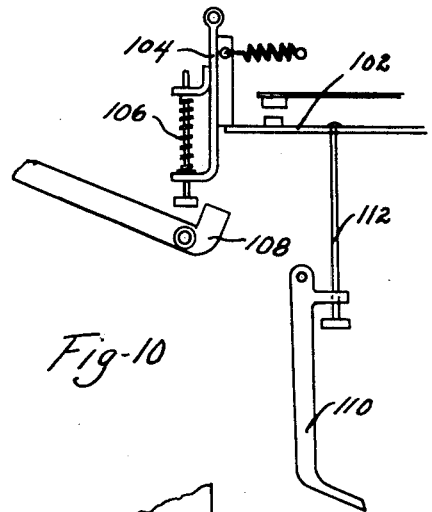
Fig. 10 is a pictorial view showing a modification of the control mechanism of Figs. 1 and 5–8.

The present invention is not limited to the specific details of the construction of Figs. 1–9. Thus Fig. 10 shows a modified construction wherein the latched contact spring 102 is biased upward, and during the idle condition of the toaster is held down by a latch or control member 104, which, unlike the latch spring 58 of Fig. 5, is a rigid pivoted member. Further, the spring or resilient means 106 for urging the control member 104 and a connecting member 108 into engagement is supported on the control member 104 and not on the bread-actuated connecting member as in Figs. 5 and 8. Similar to the construction of Figs. 1 to 9, latch 104 and the electric contacts are supported on a stationary part of the toaster frame, and the bread rack with its arm 108 are pivoted on the vertically movable carriage. A bell crank 110 and linkage rod 112 operated by the carriage as it reaches its lowermost position (similarly to the operation in Fig. 7) opens the contact 102 at the end of the downward motion.

Figure 11:
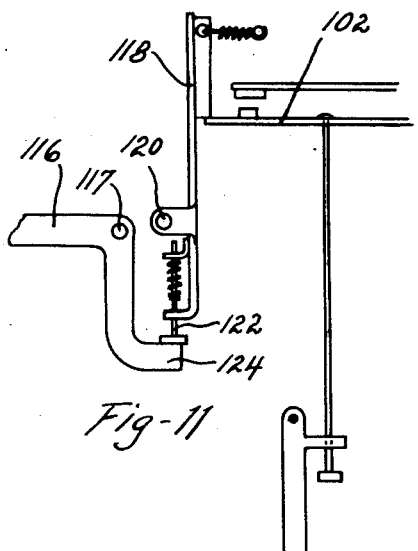
Fig. 11 shows another modification thereof.

In the modification of Fig. 11 the structure is similar to that of Fig. 10 in that the contact spring 102 is held down in the open position by a latch 118, which is pivoted to the frame structure at 120 and which carries a spring-urged plunger 122 for engaging a bread-actuated connecting member 124. The bread rack 116 is shown in its horizontal position just after returning from the toasting position and corresponds to the position of Fig. 8. The bread rack 116, which is pivoted at 117 on the vertically movable carriage will swing upward when the toast is removed to carry the connecting portion 124 toward the left and so let pin 122 drop to the right thereof. Then when bread is again loaded on the rack 116 to swing it to the horizontal position, connecting portion 124 will drive against the pin 122 to swing control member 118 counter-clockwise about its pivot 120 for releasing contact 102 and thereby initiating the downward motion of the carriage.

Figure 12:
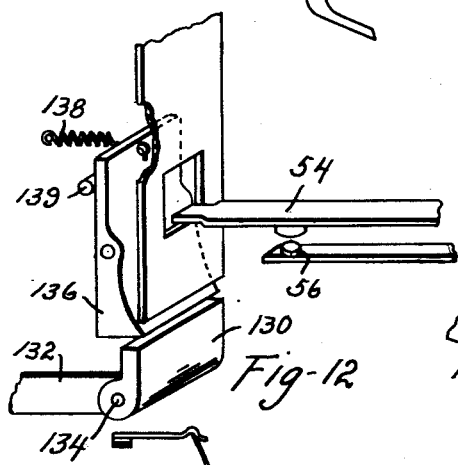
Figs. 12 and 13 show two operated positions of another modification, constituting a fourth construction embodying the present invention.
Figure 13:
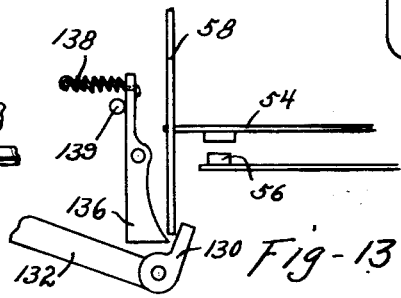

In the modification of Figs. 12 and 13 the biasing spring that lifts the carriage is utilized for providing the bias for urging the connecting member into driving engagement with the control member. In Fig. 12 the apparatus is shown in the position that it occupies when the toast is ready to be unloaded, corresponding to the position of Fig. 8. The connecting member 130 pivoted at 134 to the upwardly biased carriage, abuts a stop 136 which is pivoted on the stationary frame structure of the toaster. When the rack 132 is unloaded it tilts up to move the connecting member 130 out of engagement with the stop 136 and so lets the carriage rise as shown in Fig. 13 and thereby carry the connecting member 130 into position to drive the spring latch 58, which corresponds to the spring latch of the same number shown in Figs. 5 and 8. When the rack 132 is again loaded it swings down again to the horizontal position and in so doing causes the connecting member 130 to drive against the spring latch 58 for closing contacts 54—56. Pivoted stop 136 is deflected by this action but is brought back against stop 139 by spring 138 as the carriage carries bread rack 132 and connecting member 130 down. Contacts 54—56 are re-opened at the end of the downward motion as in Fig. 7.

Figure 14:
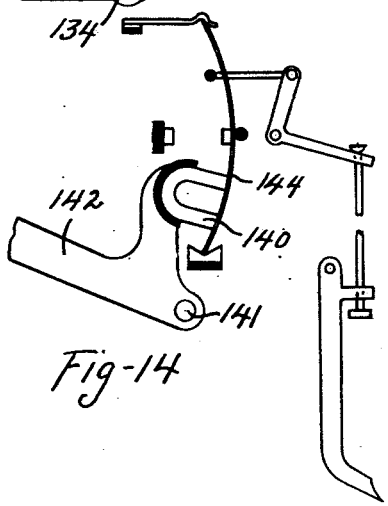
Figs. 14 and 15 show a fifth construction.
Figure 15:
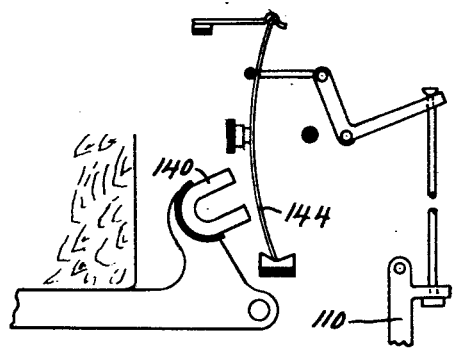

The co-action between the connecting member and control member (for example, pin 60 and latch spring 58 of Fig. 5) need not be limited to a latch type of action. Thus in Figs. 14 and 15 the connecting member comprises a permanent magnet 140 pivoted at 141 to the movable carriage. The control member comprises an over-center steel snap spring 144 which is mounted on the stationary frame structure of the toaster and which is adapted to lie either in open position as shown in Fig. 14, or in closed position as shown in Fig. 15. When the toaster is in the idle and empty position (corresponding to the position of Fig. 5) the bread rack 142 is tilted up so that magnet 140 has its pole-pieces lying against the steel spring 144. When bread is placed on the rack 142 the magnet is swung to the left as shown in Fig. 15, and as it moves it pulls the steel spring 144 with it, which snaps into its closed position shown in Fig. 15. The permissible motion of the spring 144 is less than that of the magnet 140 so that in the final part of its motion, magnet 140 pulls away from the spring and thereby breaks its driving connection therewith. As in the other constructions, the closing of the contacts energizes the magnet for lowering the carriage and with it the bread rack 142 and magnet 140. When the bread rack reaches its lowermost position it actuates the bell crank 110 which, through a linkage system, returns the spring 144 to its open contact position. Removal of toast from the rack 142 then swings magnet 140 back to the position of Fig. 14 where it again enters into a driving engagement with the spring 144.

Figure 16:
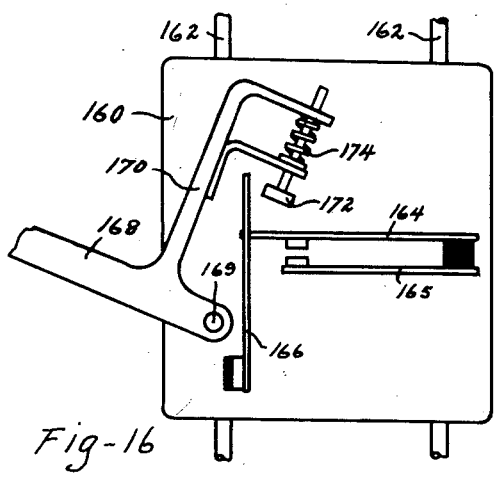
Figs. 16, 17 and 18 show a sixth construction.
Figure 17:
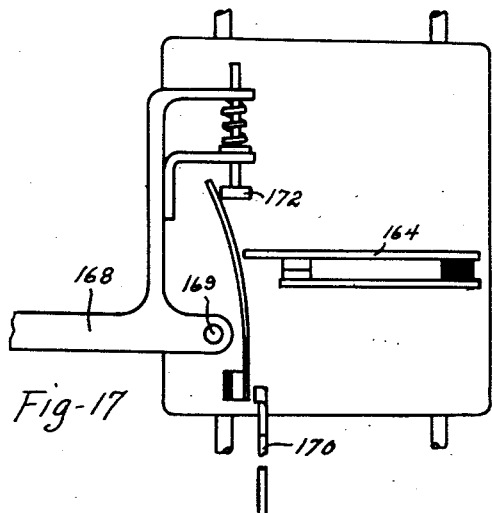
Figure 18:
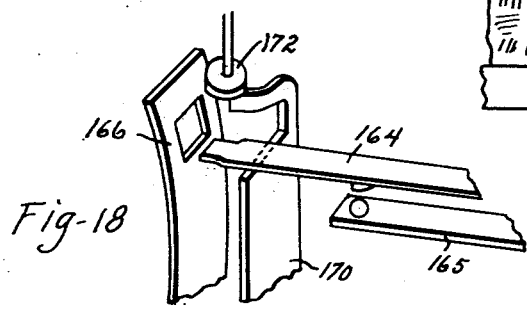

Figs. 16, 17 and 18 show a construction in which the contact mechanism, rather than being mounted on a stationary part of the toaster frame structure, is mounted on the carriage and moves therewith. Thus in Fig. 16 the carriage is represented by a rectangular member 160 arranged to slide up and down on guide rods 162. As in the construction of Figs. 1–9, this carriage is biased to its uppermost position by a spring and is pulled down by a magnet. Mounted on this carriage 160 are a pair of contacts 164 and 165 biased toward closed position, a latch spring 166 for holding the spring 164 in the open-circuit position, and a bread rack 168 pivoted at 169. An arm 170, extending upward from the bread rack, carries a pin 172 urged downward by spring 174 for engaging the latch spring, or control member 166. When the toaster is idle and unloaded the parts occupy the position shown in Fig. 16. When bread is placed on the rack 168 it swings to the horizontal position so that pin 172 moves toward the left against latch spring 166 for releasing contact spring 164 for closing those contacts to energize the magnet that pulls the carriage 160 to its lowermost position. The condition of the parts during the downward motion of the carriage is shown in Fig. 17. As the carriage 160 approaches its lowermost position the contact spring 164 and the pin 172 come into engagement with stationary abutments on a member 170, which is supported on the stationary frame structure of the toaster. These abutments serve to lift the pin 172 and the spring 164 relative to the other structure on the carriage so that they let spring 166 snap back to its normal position with pin 172 abutting the top of spring 166 and contact 164 lying in the window thereof. When the carriage has returned to its uppermost position at the end of a toasting operation, removal of the toast from the rack 168 swings the arm 170 to the left, into the position of Fig. 16, so that pin 172 slips off the end of spring 162 and drops in front of it ready to drive it when bread is again placed on the rack 168.

Figure 19:
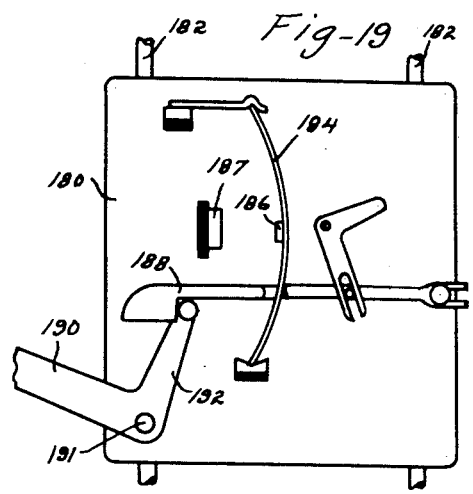
Figs. 19, 20 and 21 show a seventh construction.
Figure 20:
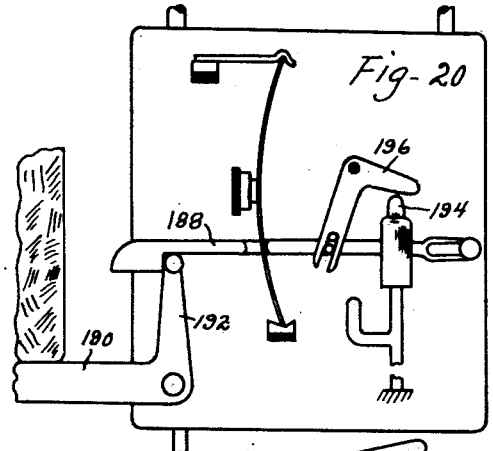
Figure 21:
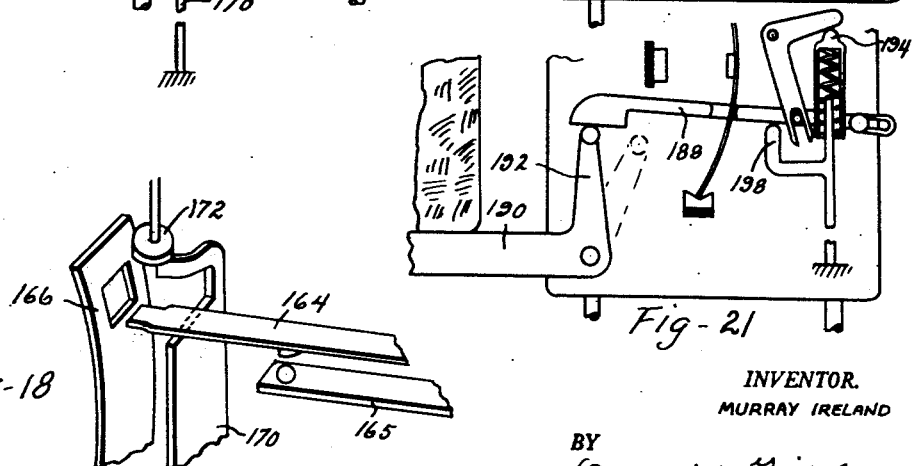

Figs. 19, 20 and 21 show a construction employing a snap-acting spring in a switch that is mounted on the bread-transporting carriage. There a carriage 180, vertically movable on guide rods 182, carries an over-center snap-acting spring 184 controlling contacts 186 and 187 and operated by a slide bar 188 which in turn is actuated by a bread rack 190. Fig. 19 shows the parts in the position they occupy when the toaster is idle and unloaded. When bread is placed thereon, the rack 190 swings about its pivot 191 so that the upwardly extending arm or connecting member 192, engaging the notch of bar 188, drives that bar to the left for moving switch spring 184 over center so that it snaps into its closed position. The contacts 186 and 187 thus closed by the spring energize the magnet for moving the carriage downward. As the carriage approaches its lowermost position a resilient abutment 194 mounted on the stationary frame structure of the toaster is engaged by an arm of a bell crank 196 on the carriage, which crank tends to drive the bar 188 toward the right for opening the switch contacts. However, bar 188 is held by the connecting arm 192 which in turn is held by the weight of the bread on the rack 190. Accordingly the abutment 194 yields until the bar 188 itself strikes a second abutment 198 for lifting it off the connecting member 192. Thereupon, the bar 188 being released, the spring in the abutment 194 expands and through the bell crank 196 drives the bar 188 to the right for opening the switch. Subsequently when the carriage has returned to its uppermost position and the toast is removed from the rack 190, the connecting member 192 moves as indicated by the dotted line in Fig. 21 so that the bar 187 may drop back into the position shown in Fig. 19. Thereupon the mechanism is ready for receiving a new slice of bread for repeating the operation.

In the construction of Figs. 22 and 23 a carrier 202 slides on vertical guide rods 204 and, as in the other constructions, is held in the uppermost position while the toaster is idle. Mounted on the carrier are a contact spring 206 and a contact 208. A latch of control member 210, also mounted on the carrier 202, normally engages the spring 206 to hold the contacts 206—208 open. A bread rack 214, when unloaded, rises to the position shown in Fig. 22 and carries the magnet 216 into engagement with the control spring 210. Spring 210 has a firm set toward the right so that it offers enough opposition to the pull of the magnet 216, as that magnet moves toward it, to prevent it from releasing contact spring 206 during that motion of the magnet. Spring 210 will of course snap toward magnet 216 when the magnet is still a short distance therefrom, but I make spring 210 stiff enough to delay that action until the distance the spring will move in that manner is less than the distance it must move for releasing spring 206. When bread is placed on the rack 214, the weight thereof swings the magnet 216 to the left, and thereby also pulls spring 210 to the left for permitting contacts 206—208 to engage. The leftward motion of control spring 210 is limited by a stop 220 to a motion somewhat less than that experienced by magnet 216. Consequently immediately after the latch spring 210 releases contact spring 206 its motion is arrested by stop 220 and the driving engagement between magnet 216 and the spring is thereby broken. Contacts 206—208 control the downward movement of the carrier 202, as by energizing a magnet for pulling it down. As the carrier 202 approaches its lowermost position, as shown in Fig. 23, the contact spring 206 is carried against a stationary abutment 222 which lifts it relative to the carrier 202 so that it is again caught and held in an open circuit position by the latch 210.

In the modification of Fig. 24 a carrier 230 supports a pivoted spring-biased bar 232 on which is carried a movable contact 234. When a bread rack 236 is loaded it moves a magnet 238 toward the left for swinging the bar 232 clockwise and thereby bringing the contact 234 into engagement with a stationary contact 240. These contacts 234—240 control the downward motion of the carrier 230 and are held in engagement by the weight of the bread on the rack 236. As the carrier approaches its lowermost position, arm 235 which supports contact 234, moves against a stationary abutment 242 so that the contacts are forced open and the arm 232 is pulled away from its engagement with the magnet 238. Subsequently when the carrier has returned to its uppermost position, removal of the toast from the rack 236 will permit the rack to rise so that the magnet 238 re-engages the bar 232 for repeating the operation.

In the modification of Figs. 25 to 27 a vertically movable carrier 250 carries a pair of contacts 252 and 254 which are normally biased to their open position, as shown in Fig. 25. A cross-shaped control member 256 rotates on its central hub 258 which in turn is free to slide in a slot 260 in the carrier 250. The control member 256 includes a downwardly extending arm 262 which is held by a spring 264 against a stop 266. This spring also urges hub 258 toward the left. Another arm 268 of the control member extends toward the left for cooperation with a latch portion or connecting member 270 of a bread rack 272. In the idle position of the toaster, bread rack 272 is tilted up and the end face 274 of the latch portion 270 faces the end of arm 268 of the control member as shown in Fig. 25. When bread rack 272 receives a slice of bread it swings down to the position shown in Fig. 26 so that latch face 274 drives the control member 256 and particularly its hub 258 toward the right. Inasmuch as spring 264 holds the lower arm 262 against the stop 266 the control member rotates slightly clockwise as its hub moves toward the right in slot 260 so that an insulating, upwardly-extending arm 276 moves against contact 254 to push it into engagement with the contact 252. These contacts close a circuit for initiating the downward movement of the carrier 250. As the carrier moves down into its lowermost position, shown in Fig. 27, a fourth arm 278, which extends to the right from the hub of control member 256, moves against a stationary abutment 280 and causes the control member to rotate counter-clockwise. This rotation moves the left-most arm 268 below the latch portion 270 of the bread rack whereupon spring 264 slides the hub 258 toward the left in the slot 260 so that arm 268 moves under the latch portion 270 into the position shown in Fig. 27. This action has moved arm 276 away from the contacts 252—254 so as to open them. When the carrier 250 returns to its uppermost position, and thereby carries the arm 278 away from the abutment 280 the control member will still be held in substantially the same position by its engagement with the lower face 282 of the latch portion 270. The toast rack 272, when it is unloaded, will again tilt up, move its latch portion 270 toward the left, and thereby let the control member 256 return to the position of Fig. 25 ready for another operation.

Still another modification is disclosed in applicant's co-pending application, Ser. No. 132,305, filed December 10, 1949.

The numerous modifications and variations of which the present invention is capable are illustrated by the several specific constructions here shown and described. For example, the connecting means that moves into engagement with the operable control member for driving it may conveniently comprise a latch or a magnet; a switch operated thereby may employ an operable member with two stable positions such as the latch 54—58 of Figs. 1–9 or the snap switch 144 of Figs. 14 and 15, or a mechanism such as that of Figs. 24–27, or other types; and the switch mechanism may be stationary or movable. Connecting and driving means of the latch type may have the cooperating latch elements extend in the same or opposite directions from their respective supports, and such a latch element may be integral with the control elements as in Figs. 1–9, or separate therefrom, as in Figs. 12 and 13. Furthermore, they may be relatively biased toward engaging position by a spring on either element, or by the bias of the carriage. The invention embraces these and other constructions within the scope of the claims.

I claim:

1. In combination in an automatic electric toaster, an oven, a vertically movable carriage, a rack pivoted on said carriage for up-and-down movement thereon, said rack being thereby supported by said carriage for supporting and moving food in said oven, electrically controlled means for moving said carriage for carrying said rack and said food thereon into a toasting position, a control switch for energizing said electrically operated means, and a driving coupler comprising self-coupling parts, one of said parts including a permanent magnet for attracting the other coupler part, said driving coupler including a coupler part on said carriage movable therewith and movable thereon by said rack and a coupler part relative to which said carriage moves, said last coupler part being connected to said switch, means biasing said rack up relative to said carriage, said rack in said upper position putting said coupler parts in juxtaposition for self coupling, whereby said coupler is operable when said parts are so coupled to close said switch in response to a downward swing of said rack on said carriage to thereby cause movement of said carriage and separation of said coupler parts, said magnet providing the tractive force by which said coupler moves said switch.

2. In an automatic cooking device, the combination with heating means, a movable carrier for receiving and supporting an article to be cooked and for moving it, means for moving said carrier, a control member operable for initiating operation of said carrier-moving means, a detent for holding said control member out of operation-initiating position, and an article-actuated member on said carrier, of a connector on said carrier movable therewith relative to said detent and movable thereon by said article-actuated member in a direction transverse to the direction of motion of said carrier, said connector being so located on said carrier that in one extreme position of said carrier said connector lies alongside said detent, one of said connector and detent including a latch element for engaging a stepped part of the other, said latch element being resiliently urged in a direction transverse the direction of motion of said connector and toward said stepped part, said latch element being so located with respect to said stepped part that with said carrier in said one extreme position thereof and said detent in position for holding said control member, said latch element rides over said stepped part in one position of said connector, and in another position of said connector latches said driving connector and detent together.

3. In an automatic cooking device, the combination with heating means, a movable carrier for receiving and supporting an article to be cooked and for moving it, means for moving said carrier, a control member for initiating operation of said carrier-moving means, a detent for holding said control member out of operation-initiating position, and an article-actuated member on said carrier, of, a connecting member on said carrier and movable therewith relative to said detent and also movable thereon by said article-actuated member in a direction transverse to the direction of motion of said carrier, stops on said carrier for limiting said transverse motion, said connecting member being so located on said carrier that in one position of said carrier and in one extreme transverse position of said connecting member on said carrier said connecting member is aligned with said dent so as to engage said detent for driving it, and a laterally limited abutment for preventing such engagement of said connecting means and said detent when said connecting means occupies its other extreme transverse position.

4. The combination of the immediately preceding claim wherein the abutting portion of one of said connecting members and detent includes a portion yieldable in the direction of motion of said carriage.

5. The combination of claim 3 wherein said detent includes a resilient leaf spring adapted to flex in said transverse direction for releasing said control member, and said connecting member includes a spring-urged plunger adapted to abut the end of said leaf spring.

6. In combination in an automatic electric toaster, an oven, a movable carriage for supporting and moving bread in said oven, said carriage including a movable bread-controlled member, a control member movable for initiating movement of said carriage, a latch element for moving said control member connected to said bread-controlled member for reciprocating movement thereby, in a direction transverse the carriage motion, and movable transverse the direction of said reciprocating movement for making driving engagement with said control member, and an abutment so located as to hold said latch element out of said driving engagement when said bread-controlled member is in bread-engaged position, and so limited as to be free of said latch element when said bread-controlled member is in bread-free position, the motion of said carriage carrying said latch element out of said driving engagement with said control member.

7. In a bread-actuated control mechanism for controlling the vertical motion of a bread carrier in an automatic toaster, said carrier including a movable, bread-actuated member, a horizontally movable control member, a latch element on said carrier moved by said bread-actuated member in substantially the same horizontal direction as said control member, and biased upward, said latch element and control member being so located that with said carrier in its upper position and said bread-actuated member in bread-engaged position thereon, said latch element abuts the bottom of said control member, the motion of said latch element being sufficient that when said bread-actuated member is in bread-free position said latch element is free to rise alongside said control member, whereby in such condition, movement of said bread-actuated member drives said control member, and downward movement of said carrier withdraws said latch element from said control member.

8. In a bread-actuated control mechanism for controlling the motion of a bread carrier in an automatic toaster, said carrier including a movable, bread-actuated member, a control member relative to which said carrier moves, said control member being movable transverse the direction of motion of said carrier for initiating a movement of said carrier out of a loading position, a driver for said control member movable with said bread carrier relative to said control member and movable by said bread-actuated member for driving said control member, said driver and control member being so located that with said carrier in said loading position and said bread-actuated member in bread-free position, parts of said driver and control member lie alongside each other in position for bread-actuated driving of said control member by said driver, an abutment for limiting the motion of said driver toward the loading position of said carrier engageable by said driver when in bread-actuated position, and disengageable by movement of said bread-actuated member to bread-free position, and resilient means urging said driver in the direction said carrier moves toward its loading position, whereby when said driver is disengaged from said abutment said resilient means moves it into driving position alongside said control member.

9. In a bread-actuated control mechanism for controlling the motion of a bread carrier in an automatic toaster, said carrier including a movable, bread-actuated member, a control member relative to which said carrier moves, said control member being movable transverse the direction of motion of said carrier for initiating a movement of said carrier out of a loading position, a driver for said control member movable with said bread carrier relative to said control member and movable by said bread-actuated member for driving said control member, said driver and control member being so located that with said carrier in said loading position and said bread-actuated member in bread-free position, parts of said driver and control member lie alongside each other in position for bread-actuated driving of said control member by said driver, said driver and control member having abutment-faces so located that with said bread-actuated member in bread-actuated position said faces abut as said carrier moves into said loading position, and resilient latch means carrying one of said parts and one of said abutment-faces, said resilient means being disengageable from the other abutment face in response to movement of said bread-actuated member to bread-free position for moving said one part into side-by-side driving engagement with the other.

10. The combination of claim 8 wherein said abutment limits the motion of said carrier towards its loading position and said resilient means moves said carrier and, with it, said driver.

11. The combination of claim 8 wherein said abutment is a part of said control member.

12. The combination of claim 8 wherein said abutment is separate from said control member.

13. The combination of claim 9 wherein said resilient latch means forms a part of said driver.

14. The combination of claim 9 wherein said resilient latch means forms a part of said control member.

(References on following page)

References Cited in the file of this patent

UNITED STATES PATENTS

| Number | Name | Date |
|---|---|---|
| 2,036,210 | Graham | Apr. 7, 1936 |
| 2,194,859 | Malmquist et al. | Mar. 26, 1940 |
| 2,196,393 | Ireland | Apr. 9, 1940 |
| 2,254,946 | Ireland | Sept. 2, 1941 |
| 2,288,713 | Ireland | July 7, 1942 |
| 2,347,385 | Wright et al. | Apr. 25, 1944 |
| 2,426,620 | Koci | Sept. 2, 1947 |
| 2,459,170 | Koci | Jan. 18, 1949 |
| 2,468,996 | Olson | May 3, 1949 |
| 2,516,503 | Bock | July 25, 1950 |
| 2,563,755 | Sutton et al. | Aug. 7, 1951 |
| 2,667,828 | Koci | Feb. 2, 1954 |